United States Patent [19]

Shirato et al.

[11] Patent Number: 4,729,773
[45] Date of Patent: Mar. 8, 1988

[54] UNIT FOR DEGASSING LIQUIDS

[75] Inventors: Kozo Shirato, Omiya; Kazuyasu Kawashima, Yokohama, both of Japan

[73] Assignee: Erma Inc., Tokyo, Japan

[21] Appl. No.: 895,492

[22] Filed: Aug. 11, 1986

[30] Foreign Application Priority Data

Mar. 4, 1986 [JP] Japan ............................. 61-48127

[51] Int. Cl.[4] ............................................. B01D 13/00
[52] U.S. Cl. ..................................... 55/158; 55/159; 210/188
[58] Field of Search ........................ 55/158, 16, 159; 210/188, 472, 436; 165/143, 905

[56] References Cited

U.S. PATENT DOCUMENTS

| 3,135,591 | 6/1964 | Jones | 55/16 |
| 3,177,934 | 4/1965 | Hoppe et al. | 165/143 |
| 3,442,002 | 5/1969 | Geary et al. | 55/158 |

FOREIGN PATENT DOCUMENTS

| 2327106 | 11/1974 | Fed. Rep. of Germany | 55/158 |
| 2907188 | 8/1979 | Fed. Rep. of Germany | 55/159 |
| 130505 | 8/1982 | Japan | 55/158 |
| 255120 | 12/1985 | Japan | 55/158 |

Primary Examiner—Bernard Nozick

[57] ABSTRACT

A unit for degassing liquids including soft, viscous substances. The unit comprises a pipe body having an interior, and a tube housed within the interior of the pipe so as to allow liquids to flow through the porous tube. The tube is of a material porous to the passage of gases but not the passage of liquids.

5 Claims, 2 Drawing Figures

UNIT FOR DEGASSING LIQUIDS

FIELD OF THE INVENTION

The subject invention relates to a unit adapted for use in transporting liquids or soft, viscous substances.

BACKGROUND OF THE INVENTION

A conventional pipe for transporting liquids or soft, viscous material (hereinafter collectively termed "liquids" for simplicity) is designed for simply transporting liquid phase materials. However, some liquids transported through a pipe are apt to degenerate due to gases such as air dissolved in the liquid. For example, ultra demineralized water used in manufacturing integrated circuit type semiconductors and solutions used for liquid chromatography are unsuitable for their intended purpose if air is dissolved in the liquid. As a consequence, a deaerator unit or a deaerator tower must be incorporated into such a liquid production process or such a liquid transportation piping system to remove the gas such as air from the liquid before the liquid is transferred through the pipe into a container or transported to a destination. However, installing a deaerator unit or a deaerator tower in a liquid production process or in a liquid transportation system requires a great deal of investment in terms of equipment costs as well as a large installation space.

SUMMARY OF THE INVENTION

An object of the present invention is to overcome the above-mentioned drawbacks of conventional pipes by providing a unit that not only transports liquids but also removes dissolved gases such as air from the liquids during their transportation.

A unit according to this invention which is adapted for achieving the above objects comprises one or a plurality of porous tubes housed and installed inside a pipe body to permit liquid to flow through those porous tubes, the internal pressure of the pipe body being reduced as required. With such a unit, when liquids are allowed to flow through the porous tubes, with internal pressure of the pipe body reduced, gases such as dissolved air are removed from the liquid during its passage through the unit.

Further objects, advantages and features of the present invention will become more fully apparent from a detailed consideration of the arrangement and construction of the constituent parts as set forth in the following description taken together with the accompanying drawings.

BRIEF DESCRIPTION OF THE DRAWING

By way of example and to make the description clearer, reference is made to the drawings in which.

DETAILED DESCRIPTION OF THE PREFERRED EMBODIMENT

Figure 1:
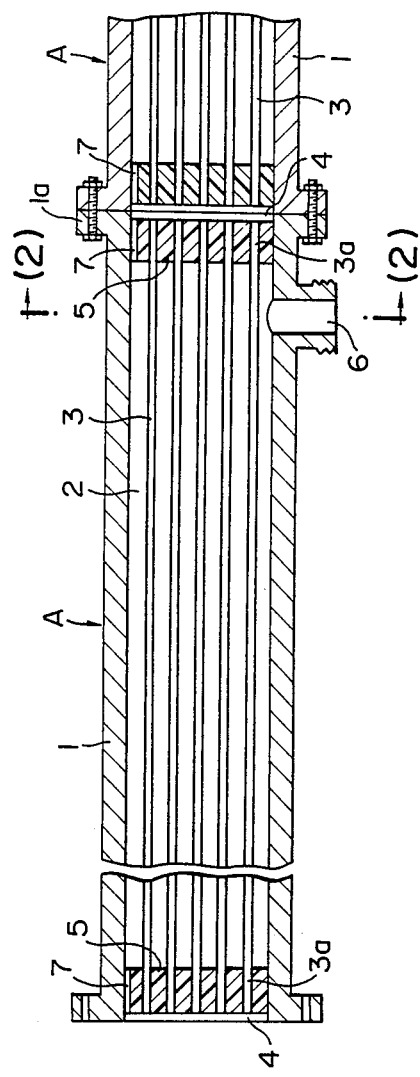
FIG. 1 is a cross-sectional view of a unit for degassing liquids according to the present invention.
Figure 2:
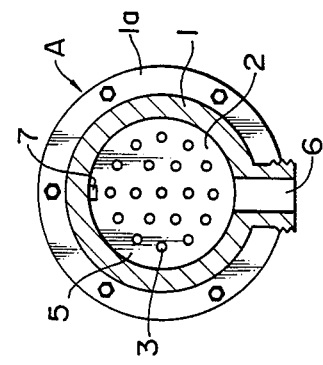
FIG. 2 is a cross-sectional view of the unit of FIG. 1 taken along line 2—2.

In FIGS. 1 and 2, degassing unit according to this invention comprises pipe body 1 containing porous tubes 3. Pipe body 1 may be made of metal or plastic and formed in the shape of an ordinary pipe. The length and diameter of pipe body 1 may be freely selected depending on the type of liquid to be transported or the particular application. Pipe body 1 may be rigid or flexible and may have integral joint flange 1a at both ends as is illustrated in this embodiment. An ordinary pipe generally used for transportation service can be used as pipe body 1, and it can be freely connected to add to its length as necessary for appropriate degassing.

Interior 2 of pipe body 1 contains one or more porous tubes 3 housed and installed so as to permit liquid to flow through the porous tubes while the interior 2 of the pipe body is depressurized. Porous tubes 3 are formed in a tube shape and are of a membrane material, such as fluoride resin or silicone resin, which has numerous fine pores that only allow the passage of gases therethrough and prevent the permeation of liquid. The inside diameter, thickness, and length of tubes 3 can be selected according to the characteristics and flow rate of the liquid flowing through the tubes, the type of membrane material, and the amount of deaeration (level of deaeration) desired.

One or more porous tubes 3 are housed and installed in interior 2 of pipe body 1 either longitudinally and linearly along the length of the pipe body as shown in the illustrated embodiment of FIG. 1 or, alternatively, the tubes can be housed and installed in a spiral manner. Both ends 3a of tubes 3 may be fixed to and supported by support plates 5 which are hermetically fixed to openings 4 at both ends of pipe body 1. Support plates 5 assure a fixed housing and installation of tubes 3 inside pipe body 1.

To depressurize interior 2 of pipe body 1, an exhaust hole 6 is formed on pipe body 1 and a vacuum pump (not shown) may be connected to the exhaust hole. Exhaust hole 6 need not be formed on each unit A when a plurality of units A are connected with each other so as to build a pipeline system. It is sufficient to provide a nipple defining an exhaust hole 6 for a single unit A or for several units A as long as communication hole 7 is formed in each support plate 5 that is hermetically fixed to openings 4 at both ends of pipe body 1 or on pipe body 1 itself. From the above, it will become apparent that interior 2 of each unit A can thus be depressurized.

In operation of the present invention, once interior 2 is depressurized or a plurality of units A, if required, are connected, liquid is allowed to pass through porous tubes 3 for transportation of the liquid to a destination. During the transportation of the liquid through tubes 3 gases such as dissolved air are removed from the liquid. In order to cause liquid to flow through porous tubes 3, pump suction or pump delivery may be used. Liquid transportation by means of pump delivery will give the liquid an additional pressure, which, coupled with the depressurized interior 2 of pipe body 1, provides greater efficiency in removing gases such as dissolved air from the liquid.

The unit according to this invention is constructed such that, in addition to permitting the transportation of liquid, it can remove dissolved gases such as air from within liquid which is being transported all without using a deaeration unit or deaeration tower. Accordingly, the incorporation of this invention in a liquid production process or in a liquid transportation piping system where gases such as air dissolved in the liquid are disadvantageous or unacceptable, such as in the chemical/medical, semiconductor manufacturing, and food/beverage industries, can eliminate the used for a deaerator unit or tower which would otherwise be required, and hence can reduce equipment size and operating cost as well. The unit can also remove unwanted dissolved gas to improve the quality of liquid, thus providing economic and quality advantages.

Use of the unit is advantageous in numerous piping applications. For example, the unit can be used in solution feed piping (solvent or sample liquid) for liquid chromatography where the presence of dissolved gases will not produce correct measurements; in process piping or transportation piping for medicines, chemicals, foods, and beverages where the presence of gases such as dissolved air will cause quality deterioration or degeneration; in feed piping for automobile brake fluid or fuel; and in water feed piping.

While there has been shown and described what is considered to be preferred embodiment of the present invention, it will be apparent to those skilled in the art that various changes and modifications may be made therein without departing from the invention as defined in the appended claims.

It is claimed:

1. A pipe system for conveying a liquid containing dissolved gases and for simultaneously degassing the liquid while moving through said pipe system, said pipe system comprising a plurality of interconnected pipe elements, each pipe element comprising a pipe body which has a flange at each of its opposite ends and defines an axially extending interior chamber, each said flange being connected to the flange of an adjacent pipe body of said pipe system, two support plates sealingly positioned in said interior chamber near the respective opposite ends of said pipe body, each of said support plates having a plurality of axial holes therethrough, a plurality of tubes positioned in said interior chamber, each of said tubes extending sealingly within and between axial holes in said support plates, said tubes being made of a diffusion membrane material which is porous to the gases in the gas-containing liquid but not the liquid, the tubes of one pipe element being in communication with the tubes of an adjacent pipe element and the pipe body of at least one of said pipe elements including a nipple for connection to a source of vacuum so as to evacuate the interior of the pipe body thereof around said plurality of tubes therein.

2. A pipe system as defined in claim 1, wherein each of said plurality of tubes of each pipe element is straight.

3. A pipe system as defined in claim 1, wherein each of said plurality of tubes of each pipe element is made of a fluoride resin.

4. A pipe system as defined in claim 1, wherein each of said plurality of tubes of each pipe element is made of a silicone resin.

5. A pipe system as defined in claim 1, wherein the adjacent support plates in at least two adjacent pipe elements include axial holes for enabling the interior chamber of the pipe body of one of said adjacent pipe elements to be in communication with the interior chamber of the pipe body of the second of said adjacent pipe elements.

* * * * *